(12) United States Patent
Schmidt et al.

(10) Patent No.: US 9,903,619 B2
(45) Date of Patent: Feb. 27, 2018

(54) ADSORPTIVE HEAT TRANSFORMATION ARRANGEMENT

(71) Applicant: Karlsruher Institut fuer Technologie, Karlsruhe (DE)

(72) Inventors: Ferdinand Schmidt, Karlsruhe (DE); Chirag Joshi, Karlsruhe (DE); Valentin Schwamberger, Tuebingen (DE); Hadi Taheri, Kempen (DE)

(73) Assignee: KARLSRUHER INSTITUT FUER TECHNOLOGIE, Karlsruhe (DE)

( * ) Notice: Subject to any disclaimer, the term of this patent is extended or adjusted under 35 U.S.C. 154(b) by 169 days.

(21) Appl. No.: 14/856,615

(22) Filed: Sep. 17, 2015

(65) Prior Publication Data

US 2016/0084540 A1 Mar. 24, 2016

(30) Foreign Application Priority Data

Sep. 18, 2014 (DE) .................. 10 2014 113 450

(51) Int. Cl.
| | |
|---|---|
| F25B 17/08 | (2006.01) |
| F25B 30/04 | (2006.01) |
| F28D 20/00 | (2006.01) |
| F25B 27/00 | (2006.01) |
| F24D 11/02 | (2006.01) |
| F24D 17/02 | (2006.01) |

(52) U.S. Cl.
CPC .......... *F25B 17/08* (2013.01); *F24D 11/0228* (2013.01); *F25B 17/083* (2013.01); *F25B 27/00* (2013.01); *F25B 30/04* (2013.01); *F28D 20/0039* (2013.01); *F24D 17/02* (2013.01); *F24D 2200/04* (2013.01); *F24D 2200/126* (2013.01); *F24D 2220/08* (2013.01); *Y02B 10/70* (2013.01); *Y02B 30/126* (2013.01); *Y02B 30/64* (2013.01); *Y02E 60/142* (2013.01)

(58) Field of Classification Search
CPC ................................ F25B 17/08; Y02B 30/64
USPC ............................................ 62/476, 478, 480
See application file for complete search history.

(56) References Cited

U.S. PATENT DOCUMENTS

| | | | | |
|---|---|---|---|---|
| 3,142,547 | A * | 7/1964 | Skarstrom | B01D 53/047 95/100 |
| 3,430,418 | A * | 3/1969 | Wagner | B01D 53/047 95/100 |

(Continued)

FOREIGN PATENT DOCUMENTS

| | | |
|---|---|---|
| DE | 3408193 C2 | 9/1985 |
| DE | 19908666 A1 | 9/2000 |

(Continued)

*Primary Examiner* — Melvin Jones (74) *Attorney, Agent, or Firm* — Leydig, Voit & Mayer, Ltd.

(57) ABSTRACT

An adsorptive heat transformation arrangement includes at least two adsorbers which are connected to at least one pump, an evaporator, and a condenser, a heat store comprising a plurality of horizontal loading and unloading devices for simultaneously stratifying and/or withdrawing a heat transfer fluid, and two or more supply lines fluidically coupled to one another and fluidically coupled to at least one adsorption module. Each horizontal loading and unloading device can be supplied with heat transfer fluid via at least one of the two or more supply lines.

13 Claims, 2 Drawing Sheets

(56) References Cited

U.S. PATENT DOCUMENTS

| | | | | |
|---|---|---|---|---|
| 4,281,204 A | * | 7/1981 | Willis | C07C 37/18 |
| | | | | 568/343 |
| 4,509,337 A | | 4/1985 | Wiart et al. | |
| 5,277,716 A | * | 1/1994 | Boppart | B01D 53/04 |
| | | | | 134/10 |
| 5,477,705 A | * | 12/1995 | Meunier | F25B 17/08 |
| | | | | 165/104.12 |
| 6,155,073 A | * | 12/2000 | Gray | F25B 17/083 |
| | | | | 62/480 |
| 2003/0005721 A1 | * | 1/2003 | Sato | B60H 1/3201 |
| | | | | 62/480 |
| 2009/0282846 A1 | | 11/2009 | Munz et al. | |
| 2014/0298832 A1 | | 10/2014 | Sommer et al. | |

FOREIGN PATENT DOCUMENTS

| | | |
|---|---|---|
| DE | 102011102036 B4 | 11/2012 |
| DE | 102012024073 A1 | 8/2013 |
| EP | 1985948 A1 | 10/2008 |
| WO | WO 2008034561 A2 | 3/2008 |

\* cited by examiner

ADSORPTIVE HEAT TRANSFORMATION ARRANGEMENT

CROSS REFERENCE TO RELATED APPLICATIONS

This application claims benefit to German Patent Application No. DE 10 2014 113 450.8, filed Sep. 18, 2014.

FIELD

The invention relates to an adsorptive heat transformation arrangement.

BACKGROUND

Adsorptive heat transformation arrangements are known in the art. There are thus sorption heat pumps which are used for heating buildings and which use higher-temperature heat provided by a gas burner. Further, sorption refrigerators are also known, which are used primarily for cooling, it preferably being possible to use heat of a temperature of less than 100° C. from solar collectors. In both cases, the physical principle of adsorption and desorption is being used, wherein a temperature range is used, at which adsorption heat in a system can be dissipated. The differential heat curves of adsorption and desorption give the maximum recoverable heat within the cycle. Internal heat recovery reduces the desorption heat to be provided from the external heat source and the efficiency of the cycle increases.

WO 2008 034 561 A2 describes an adsorption heat pump and refrigerator which comprises a thermally stratified heat store, which is used primarily for internal heat recovery between an adsorption and desorption half-cycle of a heat pump or refrigerator and which comprises a single adsorber. As a result, the efficiency of a cycle, in other words the coefficient of performance of the heat pump, can be substantially increased by comparison with a cycle without heat recovery. This stratified store receives the heat transfer fluid and can store it in various layers depending on the temperature thereof. Heat can thus be taken from the stratified store at different temperatures and stored again. In the case of use as a heat pump, a particularly large overlap of the adsorption and desorption heat curves, and thus a particularly high coefficient of performance of the heat pump, can be achieved using adsorbents requiring desorption temperatures greater than 140° C. However, in this case a heat transfer oil is required as the heat transfer fluid and storage medium, since if water were used the store would have to be configured for a high pressure and would have to be treated as a pressurised container under the EU Pressure Equipment Directive. However, in the heating technology sector, the use of heat transfer oil is associated with very high market entry barriers, and so an adsorption heat pump of this type is only suitable to a limited extent as a gas heat pump for heating buildings. If adsorbents are used which can be desorbed at lower temperatures, water can indeed be used as the heat transfer and storage fluid, but the achievable efficiency is thus reduced.

In general, the stratification in the heat store is provided for example by stratified charge lances having a large number of openings arranged vertically within the heat store. Because of the density and pressure differences occurring in the fluid of a different temperature, the fluid virtually stratifies itself when it exits the openings. However, at high flow speeds, there is increased mixing of the adjacent layers, meaning that a continuous temperature transition is produced rather than a "discrete" layer.

Because of the high specific heat capacity, the good heat exchanging properties and negligible costs, water is a preferred storage medium in many applications, including in heating technology. However, if desorption temperatures of approximately 130° C. are used, the difficulty occurs that the saturation steam pressure of the water exceeds an acceptable pressure for which major system components, in particular in the heating circuit, are configured. This pressure is typically 3 bars. In heat stores in particular, the steam pressure must not exceed the system pressure so as to prevent spontaneous steam formation in the store. This could for example result in pressure surges in various system components and damage them.

EP 1 985 948 A1 describes an adsorption heat pump which describes temporarily hydraulically decoupling part of the fluid circuit. However, this circuit is at a very high temperature (for example 140° C.) at the end of the desorption cycle, and this temperature has to be reduced, so as to avoid a pressure surge, before a valve for the heating circuit can be opened. A valve arrangement is used for the temporary hydraulic decoupling. A circulation pump is switched on for a certain period of follow-up time so as to distribute the heat of the hot adsorber and thus cool the adsorber. The pressure in this circuit can thus be reduced to the level of the heating water pressure. This has the drawback that a long follow-up time is required for cooling the sorption material, and so the process of pressure reduction in the decoupled part of the fluid circuit takes a very long time and the power of the heat pump is reduced.

U.S. Pat. No. 4,509,337 A1 discloses a solar-thermal-powered zeolite adsorption refrigerator which comprises a temperature-stratified heat store. The appliance is operated in a day/night cycle, the store primarily serving as a buffer store for short phases without solar radiation. However, the arrangement of the store does not make it possible to recover adsorption heat for the subsequent desorption.

DE 10 2012 024 073 A1 describes a stratified heat store comprising stratified apparatuses for flow abatement. Here, very fine actuation of said stratified apparatuses is required, since high specific volume flows of the adsorbers occur between adjacent stratified apparatuses.

DE 10 2011 102 036 B4 discloses a heat recovery system for an adsorption heat pump having an intermediate store as the heat store. This intermediate store is used to store sensible heat which is released or required when the temperature in an evaporator/condenser component changes. In a first operating phase, the heat store displays a temperature gradient which extends in the opposite direction to a temperature gradient of a second operating phase inside the store. Thus inaccurate use of the heat store as a stratified store is disadvantageous.

Further, multi-stage adsorption heat pumps are known which contain a plurality of adsorbers having different adsorbents, adsorption heat from an adsorber being used for desorbing another adsorber. One possible arrangement for implementing a process of this type is described in the dissertation of T. Nunez ("Characterising and evaluating adsorbents for heat transformation applications", Faculty of Physics, Freiburg University, 2001). Using multi-stage adsorption processes of this type, very high coefficients of performance of the heat pump can be achieved; the drawback of the designs known thus far is the very high equipment outlay for implementing the process.

DE 199 08 666 A1 describes an adsorption machine having two adsorbers in a "thermal wave" arrangement, wherein a heat exchanger is dedicated to each adsorber and functions as an evaporator in an adsorption half-cycle and as a condenser in a desorption half-cycle. A stratified store is used to recover heat in this case. Each heat exchanger is connected to the adsorber assigned thereto by means of a channel for the adsorbate, which is a vaporous operating agent.

DE 34 08 193 C2 further describes a multi-stage hybrid sorption pump which functions as a resorption heat pump having an adsorption stage as the high-temperature part. Two adsorbers are provided, which are connected to two storage tanks, and solutions of the adsorption stage of the hybrid heat pump which contain either a large or small amount of operating agent.

SUMMARY

According to an embodiment, an adsorptive heat transformation arrangement is provided. The adsorptive heat transformation arrangement includes at least two adsorbers which are connected to at least one pump, an evaporator, and a condenser; a heat store comprising a plurality of horizontal loading and unloading devices for simultaneously stratifying and/or withdrawing a heat transfer fluid; and two or more supply lines fluidically coupled to one another and fluidically coupled to at least one adsorption module. Each of the horizontal loading and unloading devices can be supplied with heat transfer fluid via at least one of the two or more supply lines.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A drawback of the above prior art is that the design of multi-stage heat pump systems thus far is very complex, or single-stage heat pump systems are inefficient. In particular, the above-described pressure issues occur, which are particularly serious if a heat store is integrated into the adsorption cycle, when water is used as the heat transfer fluid and at high desorption temperatures.

An embodiment of the present invention provides an improved heat transformation arrangement which can be used safely for heat transfer fluids having a high saturation steam pressure, such as water.

An adsorptive heat transformation arrangement according to an embodiment of the invention comprises two or more adsorbers which are connected to one or more pumps, an evaporator and a condenser. The heat transformation arrangement further comprises a heat store having a plurality of substantially horizontal loading and unloading devices for simultaneously stratifying and/or withdrawing a heat transfer fluid. Each loading and unloading device can be supplied with heat transfer fluid via at least one supply line, and two or more supply lines may be fluidically coupled to one another. According to the invention, the supply lines are fluidically coupled to one or more adsorbers.

The adsorbers and the components connected thereto may be arranged in adsorption modules either individually or in pairs. An adsorption module may comprise all or only certain components.

A heat transfer fluid within the meaning of the invention is used for heat exchange between the adsorption module(s), in other words between the adsorbers and the heat store which may even be filled with the heat transfer fluid either in part or completely. Particularly preferably, the invention may provide that the heat transfer fluid is water. However, other fluids are also conceivable.

In the context of the invention, "fluidically coupled" can mean that the components are interconnected by means of a circuit of the heat transfer fluid and not by means of a circuit of the operating agent steam, as is the case in the prior art.

Advantageously, one or more loading and unloading devices may be supplied with heat transfer fluid simultaneously and may connect the adsorption modules to the heat store in an appropriate manner. The loading and unloading devices may then be used not only for the adsorber circuit, but jointly for a plurality of fluid circuits. At times, there may be a superposition of volume flows into or out of individual loading devices in this case. At least three temperature levels can form in the store which correspond to three hydraulic circuits—thus, in the case of a refrigerator, a driving heat circuit, a re-cooling circuit and an adsorber circuit. Because each loading and unloading device can be supplied with heat transfer fluid via one or more supply lines or two or more supply lines may be fluidically coupled to one another, it is possible to load into and withdraw from the store simultaneously. Superposing volume flows in this manner has no significant effect on the stratification in the store and the achievable efficiency of the adsorption refrigerator or the coefficient of performance thereof. It is not necessary to provide each fluid circuit with its own loading and unloading device, since the maximum volume flow is still small enough to maintain good temperature stratification in the store.

Preferably, the invention may provide that the arrangement comprises an adsorption module having two adsorbers or two adsorption modules each having one adsorber. As a result, a multi-stage heat transformation arrangement can be constructed, which comprises a central heat store. Advantageously, using the proposed arrangement, a combination of the "heating" and "cooling" functions can be achieved, it being possible for the different temperature differences (between the evaporator and condenser temperature) required for heating or cooling to be provided efficiently by the same arrangement.

Further, the adsorbers can be connected to the heat store by means of the system of supply lines and two or more selection valves for forward flow and return flow of the heat transfer fluid. These may be multiport selection valves, which make it possible to allocate one terminal to up to six supply lines or even more. This is merely dependent on being able to select a loading or unloading device for each adsorber forward flow and return flow. This can naturally also be achieved purely by means of individual valves (open/closed) instead of the multiport valves. Each output or port of each selection valve can be respectively connected to a loading and unloading device of the heat store in this case.

These valves are simple to use and are also compact. According to the invention, however, other valve types known in the art may also be used to perform the function whereby, for each adsorber circuit, at each moment in the cycle, one of the loading and unloading devices can be selected in each case for withdrawing fluid and another can be selected for re-stratifying the fluid into the store.

According to an embodiment of the invention, the adsorption module can be hydraulically connected to or decoupled from the heat store by means of valves or a non-return valve. Non-return valves of this type may for example be 3/2-way valves. Thus, each adsorption module forms a hydraulic circuit which is closed per se. A heat source can be integrated into the adsorber circuit in at least one of the adsorption modules and can be hydraulically separated from the store during the operation of this heat source. Hydraulic switching can thus take place, which also temporarily hydraulically decouples the heat source, as well as the adsorber, from the store and instead connects it to the adsorber, which requires the highest desorption temperature during operation, whilst bypassing the store. It is advantageous in particular that, for heat transfer fluids having a high steam pressure (such as water), no special pressure store is required in spite of the high driving temperatures. Decoupling the circuit of an adsorber is therefore relevant in particular for water as the heat transfer medium, since the known pressure issues occur in this case.

In an embodiment of the invention, it may also be provided that the adsorption module merely comprises one adsorber, which likewise comprises the aforementioned components (such as a pump, etc.). Advantageously, the adsorbers may mutually independently each be connected to the heat store by means of their own hydraulic circuit and their own pump for the heat transfer fluid. This makes the arrangement extremely simple, since a central heat store is provided. Likewise, the heat source for the desorption heat which is not to be provided from the adsorption heat of one of the adsorbers does not have to be individually integrated into each adsorber circuit, but can instead be arranged centrally at the heat store for all of the adsorption modules. This can be made use of in particular if a heat transfer fluid having a lower steam pressure is used, such as heat transfer oil.

Thus, a multi-stage arrangement can advantageously be constructed from the heat transformation arrangement, it being possible to use a two-stage operation for example as a gas heat pump and a single-stage operation for example as a solar-thermal-powered refrigerator. Advantageously, the coefficient of performance and the power can be improved and a simple, modular construction can be achieved. The advantage of the multi-stage nature of the heat transformation arrangement can be attributed to the manner of integration of the stratified store, to which each adsorber can be connected by means of its own hydraulic circuit and its own pump. Using the arrangement according to the invention and appropriate actuation of the loading and unloading device for each adsorber, it can be ensured that the multi-stage heat exploitation takes place virtually spontaneously as a result of the temperature stratification which occurs in the store, in particular also because of the simple hydraulic interconnection of the adsorbers.

The invention may further provide that each adsorption module has at least two adsorber chambers for the adsorbers and at least one steam valve which is arranged between the two adsorber chambers in such a way that the adsorber chambers can be interconnected on the steam side. This can be used for mass recovery. When open, the pressure valve can achieve pressure compensation between the two chambers, one of the adsorbers being adsorbed and the other being desorbed. The high-temperature adsorber can thus be pre-cooled, it being possible during operation to switch off a driving heat source and circulate the fluid through the circuit of the high-temperature adsorber. The steam valve can remain open between the adsorbers until a saturation steam pressure is below a pressure of a storage circuit. The mass recovery can contribute to a major increase in the power of the arrangement, since a required follow-up time of the pump can be reduced because the mass recovery withdraws heat from the high-temperature adsorber again by means of desorption. During the mass recovery and while the pressure valve is open, it may be provided that cold heat transfer fluid further flows through the low-temperature adsorber. As a result, the coefficient of performance can be increased even more. Synchronisation of this type is expedient in particular for pressure compensation when water is used as the heat transfer fluid.

The heat transformation arrangement can be operated in such a way that a pair of adsorbers is operated at the same period for the adsorption/desorption cycle. For this purpose, each adsorber can be loaded in succession with colder and colder fluid from the store during the adsorption phases of said adsorber, corresponding to a decreasing withdrawal level in the store, and each adsorber can be loaded in succession with hotter and hotter fluid from the store during the desorption phases of said adsorber, corresponding to an increasing withdrawal level. In this case, one of the adsorbers can be decoupled from the store after the highest withdrawal level is achieved therein and continue to be operated using the heat source so as to further desorb the adsorber. At the maximum desired desorption temperature of the adsorber connected to the heat source, the heat source can be switched off or hydraulically decoupled, and the valve can be opened for pressure compensation between the two adsorber chambers.

In a further embodiment of the heat transformation arrangement according to the invention, it may be provided that the condenser and evaporator are formed as one component and not separately from one another. For two adsorption modules operating independently of one another and having only one adsorber each, the condenser and evaporator of each of the adsorption modules may be configured as an integrated heat exchanger, switching between the two hydraulic circuits being provided by means of external valves. This configuration is expedient for simple gas heat pumps and simple refrigerators.

To make pressure limitation possible during thermal expansion of the fluid inside the heat store by more than 50 K, the heat store may comprise, in a lower portion, a compensation vessel having a membrane such that the fluid under pressure can flow into this compensation vessel. The expansion vessel may be configured as a membrane expansion vessel (MEV) and may be connected to the lower region of the store. It may also be integrated into the store.

It may preferably be provided that two adsorbers having different adsorption materials are provided, one adsorber being configured for a higher desorption temperature (high-temperature adsorber) than another adsorber (low-temperature adsorber), and part of the adsorption heat of the high-temperature adsorber accumulating in a temperature range useable for the desorption of the low-temperature adsorber under typical temperature conditions for at least one application of the heat transformation arrangement. In this context, a silica gel or even a zeolite-like material, preferably an aluminophosphate, may be used as adsorption materials for water as a working medium. In this context, in particular the high-temperature adsorber may contain a Y zeolite as a sorption material and the low-temperature adsorber may comprise the silica gel or the less hydrophilic zeolite-like material. The low-temperature adsorber may for example also contain metal-organic framework materials (MOFs) or hydrophilised activated carbons. In the case of separate adsorption modules, different working media may also be used, for example water in the high-temperature adsorption module and methanol in the low-temperature module (for example using activated carbon as an adsorption material).

In a preferred development of the invention, the heat store may be a thermally stratified heat store which comprises one or more storage containers for a heat transfer fluid, in which container the plurality of loading and unloading devices may be arranged for simultaneously stratifying and/or withdrawing a heat transfer fluid. Using the loading and unloading devices, as disclosed previously, two or more heat fluid flows of different temperatures can be simultaneously stored in different layers or withdrawn. Preferably, the loading and unloading devices of the heat store may be arranged horizontally above one another, and may be formed in such a way that a Richardson number Ri of the heat store can be achieved in the range of from 100 to 3000. In this case, according to the invention the stratified store is arranged in the centre of the two-stage system, as a result of which improved heat recovery, i.e. a higher coefficient of performance, can be achieved compared with previous systems, together with a lesser degree of complexity in terms of the system and regulation.

An important characteristic value for mixing effects during the flow into a stratified store is the Richardson number (Y. H. Zurigat et al. "Stratified Thermal Storage Tank Inlet Mixing Characterization", Applied Energy 30, 99-111 (1988)):

$$Ri = \frac{g \cdot \beta \cdot \Delta T \cdot l}{v^2},$$

where g is acceleration due to gravity, β is the thermal expansion coefficient of the fluid, l is a characteristic length or height in the store, ΔT is the temperature difference over the characteristic height l, and v is the (average) exit speed of the fluid from one of the loading or unloading devices into the store.

According to an embodiment of the invention, instead of a level in the store, the characteristic length l may also be identified by the vertical distance between the loading and unloading devices arranged horizontally in the store, in which case ΔT is the temperature difference between the adjacent loading and unloading devices, associated with l, which would occur for linear temperature stratification of the storage container between the highest storable desorption temperature and the lowest adsorption temperature of the system. The inflow speed v should be determined at the outer surface of the loading and unloading device for the largest possible volume flow occurring in the loading and unloading device in question (for the superposition of a plurality of fluid circuits if applicable). In the embodiment according to the invention of the store, the characteristic value Ri calculated in this manner can take on values of at least 100, values in an above-mentioned range of more than 1000 being possible. This is dependent on the dimensions and dimensioning of the store. Thus for example for small stores of approximately 500 liters volume and small adsorption refrigerators having approximately 5 kW cooling power, very large Ri values of over 2000 may be achieved. For larger stores and refrigerator cooling powers, the achievable Ri values decrease (for example Ri≈500 for a 5 m³ store and an adsorption refrigerator having 50 kW cooling power). In each case, a loading and unloading device having an outlet area of approximately 50% of the store cross section was assumed.

To achieve good stratification of the heat transfer fluid and withdrawal close to the correct temperature, it is further provided that the loading and unloading devices are arranged spaced apart along the height, for example a longitudinal axis, of the heat store, it being possible for each of the loading and unloading devices to reach its own temperature level. This level gradually builds up to the average temperature level, causing a horizontal layer to occur at each loading and unloading device and the heat store to linearly stratify itself.

For horizontal loading and unloading devices, the specific volume flow may be high in the arrangement according to the invention, in particular if two fluid flows overlap. In this case, the loading and unloading devices have to attempt not only to prevent large-scale mixing in the store, but also to greatly reduce small-scale mixing effects and the input of turbulent kinetic energy into the store and to laminarise the flow. This can be achieved by way of a large increase in the outlet area, which results in large Ri values, in connection with a very large opening proportion in the outer surface of the loading and unloading device. In particular for relatively large heat pump systems, the pipe flow in the adsorber circuit is highly turbulent (typically Ri>1000). It can be achieved that this turbulence is reduced or virtually completely removed before the fluid enters the store, in order to prevent the small-scale heat transport increasing as a result of local mixing due to the turbulent flow.

According to the invention, the loading and unloading devices of the heat store are made of a porous material, either completely or in portions, for this purpose. As a result, the turbulent kinetic energy can be effectively dissipated.

Within the meaning of the invention, "porous" can mean that the material comprises cavities, including ones which extend to the surface and which are interconnected, in such a way that overall a large internal and external surface area of the material is available. The ratio of the cavity volume to the total volume is therefore very high. The higher the ratio, the more open-pore the material is. The material may also be sponge-like in construction, having a large internal area, and may have outlet openings which are small with respect to a total surface area of the material. A material of this type may for example be a reticulated polymer foam, a sieve-like plastics material structure or a high-grade steel wire mesh. In this case, the surface area of the inflow into the store can be expanded so much that it is of the same order of magnitude as the store cross section. This makes controlled flow of the fluid through the loading and unloading devices possible, in the sense that the fluid exits very slowly at these points, without forming local jets which would lead to mixing with the fluid already present in the store. As a result, only very small eddies are produced at the outlet point. As a result of the slow output, instead of mixing, displacement of the store fluid can be achieved which allows the inflowing fluid to stratify at the point where it is guided into the store. As a result of reduced thermal mixing in the store, a lower entropy production can be achieved.

As a result of the configuration of the loading and unloading devices in the form of stratified charge rings (tori), it can advantageously be achieved, in particular in the case of cylindrical storage containers, that a laminar, virtually ideal plug flow can occur in the heat store even at very high volume flows. Collective mixing of the store content can thus be reduced. As a result of the uniform distribution of the fluid to be stratified over a large area, the speed of the flow can be reduced. A Richardson number characteristic of the inflow is thus kept as large as possible, in such a way that inertial forces are small with respect to the acting buoyancy forces, as was described above.

In an alternative embodiment, the loading and unloading devices may also comprise a lance-shaped or cross-shaped hollow body. The loading and unloading devices may consist of metal, or, depending on the temperature range of the store or the application, plastics material pipes may also be used for production reasons and because of cost considerations. In this way, optimum stratification of the heat transfer fluid into the heat store can be achieved for each application.

Further, to keep the mixing and eddying between the individual layers as low as possible, one or more porous shelves (or sieve or mesh structures) may be provided between adjacent loading and unloading devices in the storage container to promote a uniform plug flow.

To achieve the above-mentioned Richardson number, the invention further provides that the fluid outlet area resulting from all of the fluid outlet openings of each of the loading and unloading devices can be in a range of from 10% to 50%, preferably of at least 15%, with respect to a horizontal cross-sectional area of the heat store. For a cylindrical storage container for example, this may be achieved in that a large-volume perforated inflow pipe is curved to form a ring (torus), which is positioned normal to a longitudinal axis in the store and is enclosed by the porous material. In this case, the speed of the inflow is of the same order of magnitude as the speed of the plug flows in the store caused by the outer fluid circuits, which is typically only a few millimeters per second. The inertial forces thus become negligible by comparison with the buoyancy, and the thermal stratification is obtained well even at high volume flows. By enlarging the outlet cross section in comparison with the prior art, the inflow speed can be significantly reduced. It may occur that the fluid input temperature at the loading and unloading device does not exactly match the store temperature at this level. In this case, a fluid screen may occur between the loading and unloading device and the "correct" level, which correlates with the corresponding temperature, in the store. However, this fluid screen may exhibit low-mixing transportation of the fluid to the thermally matching layer thereof, specifically because of the high Richardson number and the virtually ideal linear stratification provided.

The charging devices can advantageously be designed for an extreme case, which generally only occurs temporarily, whereby the volume flows superpose, and can thus produce a stable plug flow in the tank in each sub-phase of the cycle.

In an embodiment, the invention provides that the heat transformation arrangement comprises a driving heat source, in particular a burner, for a heating circuit, it being possible for the adsorption module, which comprises a high-temperature adsorber, to be fluidically connected to the driving heat source by means of a 3/2-way valve.

For the cooling scenario, the heat transformation arrangement may further comprise a heat sink which can be fluidically connected to the heat store. For the heating scenario, the evaporator may be fluidically connected by means of a pump to a low-temperature heat source such as a geothermal probe.

So as to be able to control the arrangement automatically, one or more regulation and control units and a data processing unit connected thereto may be provided. A plurality of sensors, which monitor different temperatures, pressures and so on in the arrangement, may also be installed in the arrangement.

The operating parameters and the components of the heat transformation arrangement may for example be set up and used as follows:

For water as the heat transfer fluid, 150° C. may be assumed as the maximum desorption temperature. The high-temperature adsorber may contain a Y zeolite as a sorption material and the low-temperature adsorber may contain a less hydrophilic material such as SAPO-34. At the start of a cycle, the store may be stratified linearly between 30° C. below (return flow temperature of the heating system) and 95° C. above. The high-temperature adsorber has the maximally adsorbed state thereof at 50° C.; the low-temperature adsorber is in the desorbed state at a maximum of 95° C.

Heat transfer fluid is now withdrawn from the storage container for both adsorbers simultaneously. The low-temperature adsorber is cooled in steps, the associated valve for the circuit of the low-temperature adsorber being in a position such that a first selection valve is in the forward flow and a second selection valve is in the return flow of the adsorber, the fluid being supplied to the heat store one position higher than it is withdrawn in each case, as is also known in the art. The high-temperature adsorber is heated from the storage container, there being, in addition to the associated valve in the circuit, a third selection valve in the forward flow and a fourth selection valve in the return flow, in such a way that in each case supply takes place one position lower than withdrawal. Since the withdrawal level of the adsorbing adsorber is passed through downwards and that of the desorbed adsorber is passed upwards, various situations are possible for the superposition of the volume flows when the withdrawals and devices meet.

Withdrawal for both adsorbers may take place from the same level. Since the stratification of the two adsorbers takes place at different levels, only a few additional mixing effects are thus to be expected. The same applies for the same volume flow for the two adsorbers, one adsorber supplying to the place from which the other is currently withdrawing. This results in a hydraulic short-circuit within the respective loading and unloading device or in the supply lines outside the heat store. Further, the situation may also occur where fluid from both adsorbers can be supplied to the same level, thermal mixing of the two flows inevitably occurring in the loading device. A thermodynamic mixing ratio, in other words entropy production due to the mixing of fluid of different temperatures, can be kept relatively small if the temperatures of the two fluid flows are not significantly different.

The high-temperature adsorber may in this case pass through a relatively large temperature range over the entire cycle thereof, for example 100 K temperature difference, by comparison with 65 K for the low-temperature adsorber. For the same cycle length, the temperature change in the high-temperature adsorber is always faster than that in the low-temperature adsorber. This means that the high-temperature adsorber passes through the desorption stages thereof in the store more rapidly than the low-temperature adsorber passes through the adsorption stages thereof. In relation to the storage container, this thus means that the high-temperature adsorber is then already at the highest withdrawal point before the low-temperature adsorber has arrived at the lowest withdrawal point. If the high-temperature adsorber can no longer desorb from the store, it can be hydraulically separated from the store by means of the non-return valves and connected to the heat source. The burner can be switched on and the high-temperature adsorbed can desorb until the established maximum temperature is reached.

In the meantime, the low-temperature adsorber continues to be cooled and adsorbed from the store, until the withdrawal from the lowest stratified charge ring. The end of the desorption of the high-temperature adsorber is the moment when the sub-processes synchronise. The circuit of the high-temperature adsorber, including the heat exchanger, is now at maximum temperature. If the non-return valves were opened, steam formation would occur in the heat transfer circuit. Therefore, the adsorber initially has to be pre-cooled, and this is achieved according to the invention by the above-described mass recovery. For this purpose, the burner is switched off and the fluid in the adsorber circuit between the heat exchanger and the adsorber continues to be circulated by the pump. However, since the high-temperature adsorber is no longer being heated by the burner, the desorption heat from the sensible heat of the components has to be applied, causing the temperature in the circuit of the high-temperature adsorber to fall. Once the temperature of the circuit has fallen far enough that the saturation steam pressure is below the pressure in the storage circuit again, the high-temperature adsorber can be connected to the store again. The half-cycle is thus complete, and the steam valve can be closed. The flow direction in the two circuits can now be reversed by means of the valves in the adsorber circuits. The following half-cycle runs analogously to what is described above, but without mass recovery, since at this moment the high-temperature adsorber does not have a critical temperature. Nevertheless, in particular cases mass recovery may be carried out to increase the power and the coefficient of performance. In the above-described arrangement, the follow-up phase is advantageously made much shorter, and this can significantly increase the power of the system as a whole.

According to an embodiment of the invention, a method for increasing the power of an above-disclosed heat transformation arrangement may be provided, an adsorber being decoupled from the store and desorption of at least one adsorber, which can be decoupled from the store, taking place at least at times by means of the heat source integrated into the fluid circuit decoupled from the store. Further, after the end of the desorption of the decoupled adsorber and after the heat supply is switched off, said adsorber can be cooled by opening the steam valve between the two adsorbers and desorbed by the steam mass flow into another adsorber chamber. As a result of this mass recovery, the power of the heat transformation can be increased by shortening the phase of the isosteric cooling of the decoupled adsorber.

The apparatus according to an embodiment of the invention is a heat transformation arrangement comprising a thermally stratified heat store.

Figure 1:
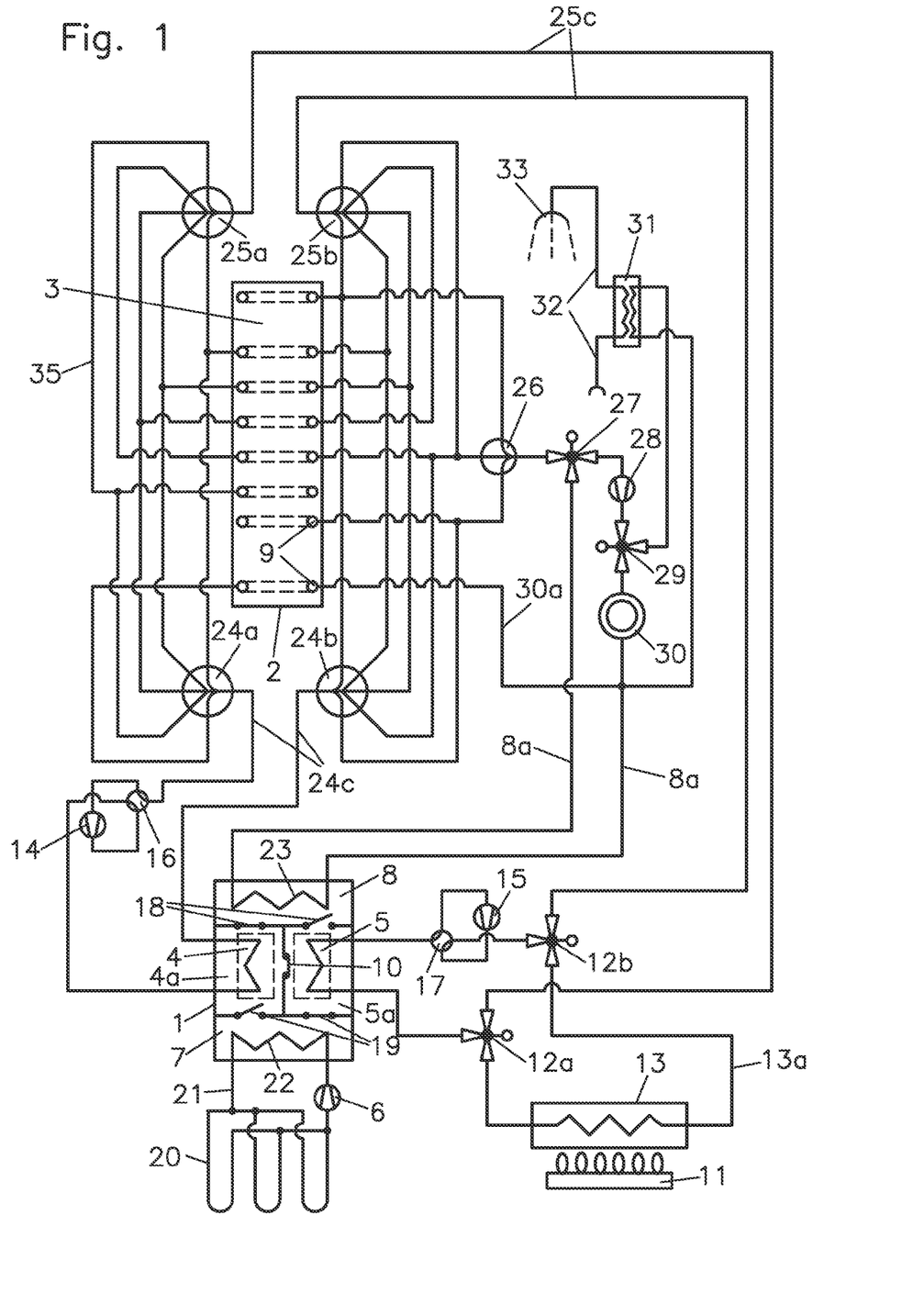
FIG. 1 is a schematic view of a heat transformation arrangement according to an embodiment of the invention.
Figure 2:
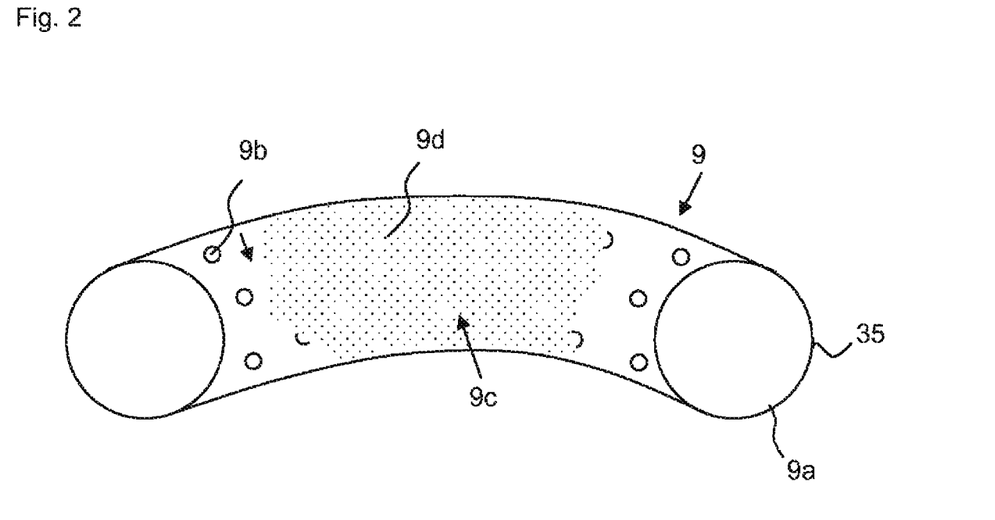
FIG. 2 is a detailed view of a loading and unloading device of a heat store according to an embodiment of the invention.

FIG. 1 shows a heat transformation arrangement of this type, which comprises an adsorption module 1 and a heat store 2 hydraulically connected thereto. The heat store 2 is a thermally stratified store comprising a cylindrical storage container 3. The storage container 3 comprises a plurality of loading and unloading devices 9 which serve to stratify and withdraw heat transfer fluid. In this case, eight different loading and unloading devices 9 are provided at different levels of the heat store 2, which devices are annular, as is also shown in FIG. 2.

The loading and unloading devices 9 are constructed from a pipe 9a in this case. The pipe may be made of metal or plastics material depending on the application requirement. The pipe 9a has openings 9b and is enclosed by a porous material 9c having a large number of pores. The pores each have an outlet opening, the areas of which together form an outlet area 9d through which the heat transfer fluid can escape. As a result of the large surface area and the open-pore structure of this loading and unloading device 9, the heat transfer fluid is introduced into the storage container 3 at very low flow speeds even with large volume flows, and so effective stratification takes place. In particular, jets can be avoided, flows which are rapid in portions and which could otherwise lead to large-scale mixing and considerable disturbance to the thermal stratification inside the storage container 3.

For unloading at high pressures inside the storage container 3, a compensation vessel 3a, comprising a membrane (not shown in the drawings) which connects the storage container 3 to a compensation vessel 3a, is provided in a lower portion of the storage container 3. In the event of a rise in pressure, the vessel 3a can receive excess heat transfer fluid and thus protect the entire heat transformation arrangement from static overpressure at high temperatures in the store.

Inside adsorber chambers 4a, 5a, the adsorption module 1 comprises adsorbers 4 in each case, these being a low-temperature adsorber 4 in the adsorber chamber 4a and accordingly a high-temperature adsorber 5 in the adsorber chamber 5a.

An evaporator chamber 7 comprising an evaporator heat exchanger 22 is further provided, which is connected to a low-temperature heat source, a geothermal probe 20 as a heat source, via a hydraulic circuit 21 by means of a pump 6. The present description applies to the heating scenario, but in the cooling scenario the geothermal probe may optionally serve as a heat sink.

The evaporator chamber 7 is coupled to the adsorber chambers 4a, 5a via steam valves 19. A condenser 8 is further provided and can be coupled to the adsorber chambers 4a, 5a via steam valves 18. In this context, the condenser 8 likewise comprises a heat exchanger 23, which is connected to a heat sink 30 (for example a building heating system) via further hydraulic connections 8a by way of a three-way mixing valve 27 and a pump 28. The heat sink 30 is further connected to the heat store 3 via a selection valve 26 and a hydraulic connection 30a and the three-way mixing valve 27. The fluid flow brought about by the pump 28 and cooled in the heat sink 30 is thus distributed between the condenser circuit 8a and the store circuit 30a depending on the position of the valve 27, the withdrawal height from the store being established by the position of the selection valve 26. Further, a further heat exchanger 31 can be supplied as an additional heat sink via the three-way mixing valve 29 and emits heat to a utility water circuit having a utility water line 32 and a utility water output 33, for example a shower.

The high-temperature adsorber 5 can be supplied with the heat transfer fluid via its own pump 15, a valve 17 which can reverse a flow direction between the adsorption phase and the desorption phase being installed in the circuit 25c. Two 3/2-way valves 12a, 12b are further provided in the circuit of the high-temperature adsorber 5, and alternatively connect the adsorber 5 either to a driving heat source, in this case a burner 11 including a heat exchanger 13, or to the heat store 2. The peculiarity in this context is that by means of these directional or non-return valves 12a, 12b, the high-temperature adsorber circuit can be decoupled from the heat store 2, so as to be able to increase the pressure in this sub-circuit to above the pressure in the storage circuit at the end of a desorption phase of the high-temperature adsorber 5 for a high temperature of the heat transfer fluid. To protect the burner circuit 13a, a check valve and an overflow valve (not shown in the drawings) connected in parallel therefrom to the storage circuit 30a may be present, which only open at a higher pressure than the pressure required to prevent steam formation in the high-temperature adsorber circuit. This overflow valve then accurately compensates the thermal expansion of the fluid in the circuit 13a comprising the high-temperature adsorber 5.

A steam valve 10 is provided between the adsorber chambers 4a, 4a, and makes substance exchange possible between the two adsorbers 4, 5 at the end of a half-cycle (mass recovery).

A hydraulic circuit 24c for the low-temperature adsorber 4 has a similar design to the circuit 25c for the high-temperature adsorber 5. The low-temperature adsorber 4 is also fluidically connected to its own pump 14 and to a valve 16 which can reverse the flow direction of the fluid.

The adsorbers 4, 5 are each connected to the storage container 3 via selection valves 24a, 24b and selection valves 25a, 25b for the forward and return flows. The selection valves are multiport selection valves. The individual outputs of the valves 24a, 24b, 25a, 25b are each connected to a loading and unloading device 9 of the storage container 3 via supply lines 35. In this context, the selection valves 24a, 24b serve to connect the low-temperature adsorber 4 via the connection line 24c, and the selection valves 25a, 25b serve to connect the high-temperature adsorber 5 via the connection line 25c.

According to FIG. 1, the storage container 3 comprises a total of more than eight stratified charge rings 9, five of which can each be selected by a multiport valve 24a, 24b, 25a, 25b in FIG. 1. Depending on the application of the heat transformation arrangement, it is possible for all of the loading and unloading devices 9 and also for only some of the loading and unloading devices 9 to be actuated in this case. In the embodiment shown in FIG. 1, the associated forward and return flows of each adsorber 4, 5 are each connected so as to be offset by one level. Thus, during desorption of the high-temperature adsorber 5, fluid can be withdrawn from the uppermost stratified charge ring 9 via valve 25b and, after passing through the adsorber, can be stratified in the next lowest ring 9 by means of valve 25a. During adsorption of the high-temperature adsorber 5, heat is stratified in the upper part of the store 2, which can be used for the subsequent desorption of the low-temperature adsorber 4 (via the valves 24a, 24b).

Depending on the application of the heat transformation arrangement, both adsorbers 4, 5 or only one adsorber may be used. If, in the "cooling" mode of operation, for example a thermal solar collector (not shown in the drawings) is used for heating the store 2, the sorption module 1 can only operate using the low-temperature adsorber 4. In this case, the solar collector serves as the heat source for desorbing the low-temperature adsorber 4 (as an alternative to the adsorption heat of the high-temperature adsorber 5 in the heating scenario), and the sub-circuit of the adsorber 5 is not in operation. This variability in the operational management highlights the advantage of the arrangement according to the invention whereby the individual adsorbers are independently coupled to the stratified store 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Adsorption module
2 Heat store
3 Storage container
3a Compensation vessel
4 Low-temperature adsorber
4a Adsorber chamber
5 High-temperature adsorber
5a Adsorber chamber
6 Pump
7 Evaporator
8 Condenser
8a Connection line (condenser circuit)
9 Heat store loading and unloading devices
9a Pipe
9b Pipe openings
9c Porous material
9d Fluid outlet openings
10 Steam valve (actively switchable)
11 Driving heat source (burner)
12a, 12b 3/2-way valves
13 Heat exchanger (for driving heat source)
13a Connection line (for burner circuit)
14 Low-temperature adsorber pump
15 High-temperature adsorber pump
16 Valve
17 Valve
18 Steam valve (switches passively in event of pressure difference)
19 Steam valve (switches passively in event of pressure difference)
20 Geothermal probe
21 Hydraulic connection
22 Evaporator heat exchanger
23 Condenser heat exchanger
24a, 24b Multiport selection valves for low-temperature adsorber circuit
25a, 25b Multiport selection valves for high-temperature adsorber circuit
26 Selection valve
27 Three-way mixing valve
28 Pump
29 Three-way mixing valve
30 Heat sink (heaters in the building)

30a Connection line (from heat sink to store)
31 Heat exchanger (for fresh water station)
32 Utility water line
33 Utility water output
35 Supply lines (from stratified charge units to selection valves)

The invention claimed is:

1. An adsorptive heat transformation arrangement comprising:
   at least two adsorbers which are connected to at least one pump, an evaporator, and a condenser;
   a heat store comprising a plurality of horizontal loading and unloading devices for simultaneously stratifying and/or withdrawing a heat transfer fluid; and
   two or more supply lines fluidically coupled to one another and fluidically coupled to at least one adsorption module,
   wherein each of the horizontal loading and unloading devices can be supplied with heat transfer fluid via at least one of the two or more supply lines.

2. The adsorptive heat transformation arrangement according to claim 1, wherein the arrangement comprises an adsorption module having the at least two adsorbers or the arrangement comprises two adsorption modules each having one of the at least two adsorbers.

3. The adsorptive heat transformation arrangement according to claim 1, wherein two of the at least two adsorbers can be connected to the heat store by at least two selection valves for a forward flow and return flow of the heat transfer fluid,
   wherein each of the at least two selection valves has a port respectively being connected to a respective horizontal loading and unloading device of the plurality of horizontal loading and unloading devices of the heat store.

4. The adsorptive heat transformation arrangement according to claim 2, wherein the at least one adsorption module has two adsorber chambers for one of the at least two adsorbers and at least one steam valve arranged between the two adsorber chambers in such a way that the adsorber chambers can be interconnected on the steam side.

5. The adsorptive heat transformation arrangement according to claim 1, wherein one of the at least two adsorbers is a low-temperature adsorber or a high-temperature adsorber.

6. The adsorptive heat transformation arrangement according to claim 1, wherein at least one of the at least two adsorbers can be fluidically connected to or decoupled from the heat store via non-return valves.

7. The adsorptive heat transformation arrangement according to claim 1, wherein the heat store is a thermally stratified heat store that includes at least one storage container for a heat transfer fluid, in which container the plurality of loading and unloading devices are arranged for simultaneously stratifying and/or withdrawing a heat transfer fluid, and
   wherein the loading and unloading devices are arranged horizontally above one another and formed in such a way that a Richardson number (Ri) of the heat store can be achieved in a range of from 100 to 3000.

8. The adsorptive heat transformation arrangement according to claim 7, wherein each of the loading and unloading devices includes at least one of:
   a porous material at least in portions,
   an annular or lance-shaped or cross-shaped hollow body, or
   at least one porous shelf for partial fluidic separation of adjacent loading and unloading devices.

9. The adsorptive heat transformation arrangement according to claim 7, wherein a fluid outlet area resulting from all fluid outlet openings of each of the loading and unloading devices is in a range of from 10% to 50% of a horizontal cross-sectional area of the heat store.

10. The adsorptive heat transformation arrangement according to claim 7, wherein the loading and unloading devices are arranged spaced apart along a height of the heat store, a temperature level being reached at each of the loading and unloading devices.

11. The heat transformation arrangement according to claim 1, wherein an adsorption material of the at least two adsorbers is a silica gel or a zeolite-like material.

12. The heat transformation arrangement according to claim 1, wherein an adsorption material of the at least two adsorbers is aluminophosphate.

13. The heat transformation arrangement according to claim 7, wherein a fluid outlet area resulting from all fluid outlet openings of each of the loading and unloading devices is approximately 15% of a horizontal cross-sectional area of the heat store.

* * * * *